(12) United States Patent
Fukamachi et al.

(10) Patent No.: US 7,134,326 B2
(45) Date of Patent: Nov. 14, 2006

(54) APPARATUS AND METHOD FOR INSPECTING MOTORCYCLE

(75) Inventors: Kazuyuki Fukamachi, Sayama (JP); Sumio Noguchi, Sayama (JP); Masahiko Kaneko, Sayama (JP); Yoshiyuki Asada, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/503,994

(22) PCT Filed: Feb. 28, 2003

(86) PCT No.: PCT/JP03/02318

§ 371 (c)(1),
(2), (4) Date: Aug. 9, 2004

(87) PCT Pub. No.: WO03/074988

PCT Pub. Date: Sep. 12, 2003

(65) Prior Publication Data

US 2005/0151415 A1    Jul. 14, 2005

(30) Foreign Application Priority Data

| Mar. 4, 2002 | (JP) | ............................. 2002-057330 |
| Mar. 4, 2002 | (JP) | ............................. 2002-057331 |
| Mar. 4, 2002 | (JP) | ............................. 2002-057332 |
| Mar. 4, 2002 | (JP) | ............................. 2002-057333 |

(51) Int. Cl.
*G01L 5/28* (2006.01)
(52) U.S. Cl. ........................................................... 73/121
(58) Field of Classification Search ................... 73/121
See application file for complete search history.

(56) References Cited

U.S. PATENT DOCUMENTS

| 4,697,825 A | * | 10/1987 | Hayashi et al. ............. 280/276 |
| 4,702,339 A | * | 10/1987 | Hayashi et al. ............. 180/219 |
| 4,770,473 A | * | 9/1988 | Tsuchida ................. 303/115.6 |
| 4,852,701 A | * | 8/1989 | Wakatsuki ............... 188/181 A |
| 4,989,922 A | * | 2/1991 | Pickenhahn et al. ........ 303/137 |
| 5,043,898 A | * | 8/1991 | Yoshino ....................... 701/78 |
| 5,392,640 A | * | 2/1995 | Fukuda et al. ................ 73/117 |

(Continued)

FOREIGN PATENT DOCUMENTS

EP      08-054323 A     2/1996

(Continued)

*Primary Examiner*—Edward Lefkowitz
*Assistant Examiner*—Octavia Davis
(74) *Attorney, Agent, or Firm*—Birch, Stewart, Kolasch & Birch, LLP (57) ABSTRACT

An apparatus and method for inspecting a motorcycle. A braking force inspecting unit is provided for calculating a braking force from results measured by a torque measuring unit to determine whether the braking force is acceptable or not when a brake is fully applied and the support rollers are rotated by a motor. A speedometer inspecting unit is provided for determining whether a speedometer is acceptable or not from results measured by a rotational speed measuring unit when the support rollers are rendered rotatable and an engine of the motorcycle is operated. A brake system inspecting unit is provided for calculating a change in a vehicle speed of the motorcycle from the results measured by the rotational speed measuring unit and determining whether an ABS and a CBS operate acceptably or not when the engine of the motorcycle is operated.

10 Claims, 5 Drawing Sheets

U.S. PATENT DOCUMENTS

| | | | | |
|---|---|---|---|---|
| 5,495,753 A | * | 3/1996 | Watanabe et al. | 73/123 |
| 5,542,290 A | * | 8/1996 | Suzuki | 73/117 |
| 5,964,509 A | * | 10/1999 | Naito et al. | 303/112 |
| 6,089,682 A | * | 7/2000 | Ishikawa et al. | 303/163 |

FOREIGN PATENT DOCUMENTS

| | | |
|---|---|---|
| EP | 10-160641 A | 6/1998 |
| EP | 2001-281108 A | 10/2001 |

* cited by examiner

APPARATUS AND METHOD FOR INSPECTING MOTORCYCLE

This application is a 371 of PCT/JP03/02318 filed Feb. 28, 2003.

TECHNICAL FIELD

The present invention relates to an apparatus for and a method of inspecting a motorcycle, and more particularly to an apparatus for and a method of inspecting a motorcycle for a braking force, a speedometer, and a brake system thereof, and also inspecting operation of an antilock brake system thereof and operation of a front/rear wheel combined brake system thereof.

BACKGROUND ART

Heretofore, one known apparatus for inspecting an antilock brake system (hereinafter referred to as "ABS") and a front/rear wheel combined brake system (hereinafter referred to as "CBS") for motorcycles is disclosed in Japanese laid-open patent publication No. 2001-281108.

The disclosed inspecting apparatus has a pair of front wheel support rollers (a first front wheel support roller and a second front wheel support roller) for supporting a front wheel seated thereon, and a pair of rear wheel support rollers (a first rear wheel support roller and a second rear wheel support roller) for supporting a rear wheel seated thereon, the first front wheel support roller and the first rear wheel support roller being coupled together for rotation in synchronism with each other. Each of the rollers has its surface made of a low friction material. The second front wheel support roller and the second rear wheel support roller are associated with respective rotational speed detecting means coupled thereto for detecting respective rotational speeds thereof. The first rear wheel support roller is coupled to a drive motor through a clutch.

For inspecting an ABS on a motorcycle with the inspecting apparatus thus constructed, the front and rear wheels of the test vehicle are placed respectively on the pair of front wheel support rollers and the pair of rear wheel support rollers, and the first rear wheel support roller is rotated by the drive motor. The first and second rear wheel support rollers are synchronously rotated by the rear wheel, and their rotation is transmitted through the first front wheel support roller to the front wheel and the second front wheel support roller. Therefore, all the rollers are synchronously rotated.

When the rotational speeds of the rollers as detected by the rotational speed detecting means reach a predetermined speed, the clutch between the first rear wheel support roller and the drive motor is disengaged, and the operator fully applies the brake. The rollers separated from the drive power from the drive motor by the clutch continuously rotate by inertia, and their rotational speed are gradually lowered by the brake. Since the surface of each of the rollers made of the low friction material, a slippage occurs between the wheels of the motorcycle and the rollers, causing the ABS to operate to apply a pumping brake. The rollers are thereafter stopped by the brake, and the times at which the rollers are stopped are compared with a value determined by an actual measurement to determine whether the ABS performance is acceptable or not. For inspecting the CBS of the motorcycle with the conventional inspecting apparatus, the operator applies one of the brakes (e.g., the front wheel brake) to cause the other brake (e.g., the rear wheel brake) to operate in combination therewith, and the times at which the rollers are stopped are compared with a value determined by an actual measurement to determine whether the CBS performance is acceptable or not, in the same manner as when the ABS is inspected.

According to the ABS inspection process carried out by the conventional inspecting apparatus, the time required to inspect the ABS is relatively long because no judgement results are obtained unless the support rollers are stopped after the operator has applied the brake. If the front wheel ABS and the rear wheel ABS are to be inspected successively, then the support rollers which have been stopped after the inspection of the front wheel ABS is finished need to be rotated up to a rotational speed that is high enough to inspect the rear wheel ABS, resulting in a poor inspection efficiency. The CBS inspection process also takes a relatively long inspection time because stopping times and stopping distances are used for judgement and hence no judgement results are obtained unless the support rollers are stopped after the operator has applied the brakes. Furthermore, the operator is required to be skilled as an activation of the CBS is confirmed based on a bodily feel of the operator, with the result that a high inspection accuracy cannot be achieved.

The conventional inspecting apparatus determines whether the ABS and the CBS are acceptable or not by comparing the times at which the rollers are stopped with a value determined by an actual measurement. If the ABS or the CBS is judged as a failure, then the conventional inspecting apparatus cannot identify whether the ABS or the CBS suffers a control failure or the braking forces are problematic.

Though the surface of each of the rollers made of the low friction material, if the inertial rotation of the rollers is not sufficiently fast when the operator apply the brakes, then a slippage between the wheels and the rollers that is in conformity with actual running conditions on the road cannot reliably be produced.

Generally, motorcycles have a speedometer for measuring the speed thereof while they are running. The inspecting apparatus keeps a motorcycle under test running on the rollers. Therefore, the inspecting apparatus is also desired to inspect efficiently the speedometer of the motorcycle under test.

In view of the above drawbacks, it is an object of the present invention to provide an apparatus for and a method of inspecting a motorcycle accurately and efficiently by easily locating a defective part and greatly reducing a period of time required to inspect each inspection item of the motorcycle.

DISCLOSURE OF THE INVENTION

According to the present invention, there is provided an apparatus for inspecting a motorcycle for a braking force, a speedometer, and a brake system thereof, comprising rotatable first and second front wheel support rollers having respective axes lying parallel to each other, for supporting a front wheel of the motorcycle, rotatable first and second rear wheel support rollers having respective axes lying parallel to each other, for supporting a rear wheel of the motorcycle, coupling means for coupling the first front wheel support roller and the first rear wheel support roller to each other for synchronous rotation thereof, rotational speed measuring means coupled to ends of respective rotational shafts of the second front wheel support roller and the second rear wheel support roller, for measuring respective rotational speeds of the second front wheel support roller and the second rear wheel support roller, a pair of drive means separably connected by clutches to the respective other ends of the rotational shafts of the second front wheel support roller and the second rear wheel support roller, for rotating the second front wheel support roller and the second rear wheel support roller, respectively, with the drive means being connected thereto by the clutches, torque measuring means disposed between the drive means and the clutches, for measuring torques applied respectively to the rotational shafts of the second front wheel support roller and the second rear wheel support roller, braking force inspecting means for calculating a braking force based on the torques measured by the torque measuring means and determining whether the calculated braking force is acceptable or not, when the second front wheel support roller and the second rear wheel support roller are rotated by the drive means with a driving mechanism on the motorcycle being in a neutral gear position and the motorcycle being braked, speedometer inspecting means for calculating a vehicle speed of the motorcycle based on the rotational speed measured by one of the rotational speed measuring means and determining whether the speedometer on the motorcycle is acceptable or not, when the drive means are disconnected by the clutches from the second front wheel support roller and the second rear wheel support roller and a drive wheel of the motorcycle is driven by the driving mechanism on the motorcycle, and brake system inspecting means for determining whether an antilock brake system and a front/rear wheel combined brake system of the motorcycle operate acceptably or not based on the rotational speeds measured by the rotational speed measuring means, when the drive means are disconnected by the clutches from the second front wheel support roller and the second rear wheel support roller and the antilock brake system and the front/rear wheel combined brake system are operated while the drive wheel of the motorcycle is being driven.

With the above apparatus, the front wheel of the motorcycle is supported on the first and second front wheel support rollers, and the rear wheel of the motorcycle is supported on the first and second rear wheel support rollers. Since the front wheel is held against the first front wheel support roller and the second front wheel support roller, rotation can be transmitted between the first front wheel support roller and the second front wheel support roller through the front wheel. Likewise, the rear wheel is held against the first rear wheel support roller and the second rear wheel support roller, so that rotation can be transmitted between the first rear wheel support roller and the second rear wheel support roller through the rear wheel. The first front wheel support roller and the first rear wheel support roller are synchronized in rotation by the coupling means.

The braking force inspecting means can inspect respective braking forces of front and rear wheel brakes, and the brake system inspecting means can inspect the antilock brake system and the front/rear wheel combined brake system. The speedometer inspecting means is capable of inspecting whether the speedometer on the motorcycle is acceptable or not.

Specifically, for inspecting the braking force of the motorcycle, the driving mechanism on the motorcycle is placed in the neutral gear position, and the brake is fully applied. To inspect the braking force of the front wheel brake, the front wheel brake is fully applied. To inspect the braking force of the rear wheel brake, the rear wheel brake is fully applied. Then, the clutches are engaged, and the drive means rotate the second front wheel support roller and the second rear wheel support roller. Since the brakes are fully applied, a friction occurs between the second front wheel support roller and the second rear wheel support roller, and the front wheel and the rear wheel, and the torque measuring means measures torques applied to the second front wheel support roller and the second rear wheel support roller. The braking force inspecting means calculates a braking force based on the torques measured by the torque measuring means and determines whether the braking force is acceptable or not. In this manner, the braking force of the motorcycle can easily be inspected.

For inspecting the speedometer on the motorcycle, the clutches are disengaged, allowing the second front wheel support roller and the second rear wheel support roller to rotate freely. Then, the driving mechanism on the motorcycle drives the drive wheel of the motorcycle. One of the rotational speed measuring means which is associated with the second rear wheel support roller, for example, measures the rotational speed of the second rear wheel support roller. The speedometer inspecting means calculates a vehicle speed of the motorcycle from the measured rotational speed, and compares the calculated vehicle speed with a vehicle speed displayed on the speedometer on the motorcycle to determine whether the speedometer on the motorcycle is acceptable or not. The speedometer on the motorcycle can thus be inspected with ease.

For inspecting the antilock brake system (ABS) and the front/rear wheel combined brake system (CBS) on the motorcycle, the clutches are disengaged, allowing the second front wheel support roller and the second rear wheel support roller to rotate freely. Then, when the vehicle speed of the motorcycle reaches a predetermined speed, the brake of the motorcycle is fully applied to operate the ABS and the CBS. The brake system inspecting means calculates a change in the vehicle speed of the motorcycle based on the rotational speeds measured by the rotational speed measuring means to determine whether the ABS and the CBS operate acceptably or not. The ABS and the CBS on the motorcycle can thus be inspected with ease.

The brake system inspecting means comprises calculating means for calculating a change in the vehicle speed of the motorcycle based on the rotational speeds measured by the rotational speed measuring means while the rotational speeds of the second front wheel support roller and the second rear wheel support roller are being reduced when the motorcycle is braked, and judging means for determining whether the antilock brake system and the front/rear wheel combined brake system operate acceptably or not based on the change calculated by the calculating means, without the second front wheel support roller and the second rear wheel support roller being stopped against rotation.

The calculating means calculates a change in the vehicle speed of the motorcycle based on the rotational speeds of the second front wheel support roller and the second rear wheel support roller while their rotational speeds are being reduced when the motorcycle is braked. The judging means determines whether the ABS and the CBS operate acceptably or not from the calculated change in the vehicle speed of the motorcycle while the rotational speeds of the support rollers are being reduced. Since the ABS and the CBS can be inspected without using a time in which the motorcycle is at rest as is the case with the conventional apparatus, the time required for inspecting the ABS and the CBS can be shortened.

According to the present invention, there is also provided a method of inspecting a motorcycle for a braking force, a speedometer, and a brake system thereof, comprising the steps of seating a front wheel of the motorcycle on a pair of rotatable front wheel support rollers having respective axes lying parallel to each other, seating a rear wheel of the motorcycle on a pair of rotatable rear wheel support rollers having respective axes lying parallel to each other, inspecting a braking force based on torques applied to rotational shafts of one of the front wheel support rollers and one of the rear wheel support rollers when the one front wheel support roller and the one rear wheel support roller are rotated by a drive means separably coupled to the rotational shafts, with a driving mechanism on the motorcycle being in a neutral gear position and the motorcycle being braked, calculating a vehicle speed of the motorcycle based on the rotational speed of either one of the front and rear wheel support rollers to inspect the speedometer on the motorcycle, when the drive means are disconnected from the front and rear wheel support rollers and a drive wheel of the motorcycle is driven by the driving mechanism on the motorcycle, and thereafter, inspecting an antilock brake system and a front/rear wheel combined brake system of the motorcycle for operation thereof while keeping the support rollers in rotation by calculating a change in a vehicle speed of the motorcycle from respective rotational speeds of one of the front wheel support rollers and one of the rear wheel support rollers when the antilock brake system and the front/rear wheel combined brake system are operated while the drive wheel of the motorcycle is being driven by the driving mechanism, reducing the rotational speeds of the support rollers.

With the above method, the braking force is first inspected, then the speedometer is inspected, and thereafter the ABS and the CBS are inspected. For inspecting the speedometer and also for inspecting the ABS and the CBS, the front wheel support rollers and the rear wheel support rollers are rendered rotatable, and the drive wheel of the motorcycle is driven by the driving mechanism on the motorcycle. Since the ABS and the CBS are inspected while the front wheel support rollers and the rear wheel support rollers are not stopped from the speedometer inspecting step, the ABS and the CBS can quickly be inspected after the speedometer has been inspected. Therefore, the ABS and the CBS can efficiently be inspected.

The ABS and the CBS are inspected based on the rotational speeds of one of the front wheel support rollers and one of the rear wheel support rollers which have been sampled while the rotational speeds of the support rollers are being reduced. Consequently, after the ABS and the CBS for the front wheel have been inspected, the ABS and the CBS for the rear wheel can be inspected while keeping the support rollers in rotation. Thus, the inspection of the front wheel brake systems can switch to the inspection of the rear wheel brake systems without stopping the rotation of the support rollers, so that the time required to inspect those brake systems can greatly be reduced.

Before the ABS and the CBS are inspected for their operation, the braking force is inspected. Therefore, if the judged result represents a failure, it can easily be determined whether the failure is an ABS or CBS control failure or a braking force failure. Thus, the operator can smoothly adjust the failing component.

According to the present invention, there is also provided an apparatus for inspecting operation of an antilock brake system of a motorcycle, comprising a pair of rotatable support rollers having respective axes lying parallel to each other, for supporting a front wheel of the motorcycle, a pair of rotatable support rollers having respective axes lying parallel to each other, for supporting a rear wheel of the motorcycle, rotational speed measuring means for measuring a rotational speed of at least one of the front and rear wheels through the support rollers which support the one of the front and rear wheels when the antilock brake system operates on the at least one of the front and rear wheels, calculating means for determining a peak value produced by a change in the rotational speed of the one of the front and rear wheels when the antilock brake system operates, based on the rotational speed measured by the rotational speed measuring means, and judging means for determining whether the peak value determined by the calculating means falls in a predetermined range or not.

For inspecting the ABS with the above apparatus, the front and rear wheels are seated on the respective pairs of support rollers. Then, the wheel (front wheel or the rear wheel) on which the ABS to be inspected is to operate is braked to operate the ABS. Specifically, the operator operates an engine of the motorcycle on the support rollers. When the vehicle speed reaches a predetermined inspection starting speed, the operator places a transmission on the motorcycle into a neutral gear position, and fully applies the brake. When the wheel is quickly braked, a slippage occurs between the wheel and the support rollers, causing the ABS to start operating.

When the ABS is operated, the brake is repeatedly applied and disengaged. The rotational speed of the wheel is increased and reduced, and measured by the rotational speed measuring means through the support roller to which the rotational behavior of the wheel is transmitted. Based on a measured value from the rotational speed measuring means, the calculating means determines a peak value produced by a change (an increase or reduction in deceleration or acceleration) in the rotational speed of the wheel. The judging means then determines whether the peak value determined by the calculating means falls in a predetermined range or not. Since the peak value corresponds to a state in which the brake is repeatedly applied and disengaged, if the peak value falls out of the predetermined range, then the wheel is possibly locked or not sufficiently decelerated. By using the calculated peak value in the judging process of the judging means, the ABS can be inspected without sampling a period of time that elapses from the time when the brake is applied to the time when the wheel is stopped.

Since the period of time that elapses from the time when the brake is applied to the time when the wheel is stopped does not need to be sampled, the ABS can be inspected in a short period of time. For inspecting the ABS for the rear wheel after the ABS for the front wheel, the wheels and the support rollers are not required to be stopped in rotation, and hence the inspecting efficiency is high.

According to the present invention, there is further provided a method of inspecting operation of an antilock brake system of a motorcycle, comprising the steps of rotating a front wheel of the motorcycle which is supported on a pair of front wheel support rollers, rotating a rear wheel of the motorcycle which is supported on a pair of rear wheel support rollers, fully braking one of the front and rear wheels on which the antilock brake system operates, measuring a rotational speed of the wheel on which the antilock brake system has operated, through the support rollers which supports the wheel, determining a peak value produced by a change in the rotational speed of the wheel when the antilock brake system operates, based on the measured rotational speed, and judging that the antilock brake system is acceptable if the determined peak value falls in a predetermined range and that the antilock brake system is not acceptable if the determined peak value does not fall in the predetermined range.

With the above method, a rotational speed of the wheel is measured through the support rollers, and a peak value produced by a change in the rotational speed of the wheel is determined based on the measured rotational speed. Then, it is determined whether the antilock brake system is acceptable or not based on the peak value. The determined peak value corresponds to a state in which the brake is repeatedly applied and disengaged. If the peak value falls out of the predetermined range, then the wheel is possibly locked or not sufficiently decelerated. Therefore, if the peak value falls in the predetermined range, then the ABS is judged as operating acceptably, and if the peak value falls out of the predetermined range, then the ABS is judged as not operating acceptably.

Since the ABS is judged based on the peak value produced when the brake is repeatedly applied and disengaged by the ABS, the ABS can be inspected in a short period of time without sampling a period of time that elapses from the time when the brake is applied to the time when the wheel is stopped. For inspecting the ABS for the rear wheel after the ABS for the front wheel, the wheels and the support rollers are not required to be stopped in rotation, and hence the inspecting efficiency is high.

The above step of determining a peak value preferably comprises the step of determining a first peak value produced by a change in the rotational speed of the wheel when the wheel is disengaged from braking for the first time when the antilock brake system operates, a second peak value produced by a change in the rotational speed of the wheel when the wheel is braked next time, and a third peak value produced by a change in the rotational speed of the wheel when the wheel is disengaged from braking next time, and the above step of judging preferably comprises the step of judging that the antilock brake system is acceptable if all of the determined first, second, and third peak values fall in respective predetermined ranges, and that the antilock brake system is not acceptable if either one of the determined first, second, and third peak values do not fall in the corresponding one of the respective predetermined ranges.

During an initial period of time after the ABS has started to operate, the vehicle speed undergoes greatest changes and it increases and decreases relatively largely depending on the rotational speed of the wheel. Therefore, the first through third peak values determined in an initial phase of operation of the ABS clearly represent the operating conditions of the ABS. Thus, the ABS can be efficiently be inspected with sufficiently high accuracy based on the first through third peak values. The time required to inspect the ABS can be shortened as the inspection of the ABS can be finished in the initial phase of operation of the ABS.

According to the present invention, there is also provided an apparatus for inspecting operation of an antilock brake system of a motorcycle, comprising a pair of rotatable front wheel support rollers having respective axes lying parallel to each other, for supporting a front wheel of the motorcycle, a pair of rotatable rear wheel support rollers having respective axes lying parallel to each other, for supporting a rear wheel of the motorcycle, coupling means for connecting one of the front wheel support rollers and one of the rear wheel support rollers to each other for synchronous rotation thereof, and rotational speed measuring means coupled respectively to the other of the front wheel support rollers and the other of the rear wheel support rollers, for measuring respective rotational speeds of the other front wheel support roller and the other rear wheel support roller, wherein inertial forces produced by the one of the front wheel support rollers and the one of the rear wheel support rollers which are connected by the coupling means are larger than inertial forces produced by the other front wheel support roller and the other rear wheel support roller which are coupled to the rotational speed measuring means.

Because the inertial forces produced by the one of the front wheel support rollers and the one of the rear wheel support rollers are larger than the inertial forces produced by the other front wheel support roller and the other rear wheel support roller, when the operator applies the brake to the motorcycle, a slippage occurs between the support rollers with the larger inertial forces and the wheel earlier than between the support rollers with the smaller inertial forces and the wheel, reliably activating the ABS on the motorcycle. At this time, inasmuch as the one of the front wheel support rollers and the one of the rear wheel support rollers which produce the larger inertial forces are synchronously rotated by the coupling means, the front and rear wheels of the motorcycle well reflect actual running conditions on the road.

Even when a slippage occurs between the one of the front wheel support rollers and the one of the rear wheel support rollers and the wheels, the other front and rear wheel support rollers which produce smaller inertial forces remain gripping the front and rear wheels. Therefore, the rotational speed measuring means coupled to the other front and rear wheel support rollers can measure the rotational behavior of the front and rear wheels with high accuracy.

The one of the front wheel support rollers and the one of the rear wheel support rollers which are connected by the coupling means are larger in diameter than the other front wheel support roller and the other rear wheel support roller which are coupled to the rotational speed measuring means. On the front wheel, one of the front wheel support rollers is larger in diameter than the other front wheel support roller, so that the inertial force produced by the one of the front wheel support rollers can be made larger than the inertial force produced by the other front wheel support roller. On the rear wheel, one of the rear wheel support rollers is larger in diameter than the other rear wheel support roller, so that the inertial force produced by the one of the rear wheel support rollers can be made larger than the inertial force produced by the other rear wheel support roller. Consequently, the inertial forces produced by the one of the front wheel support rollers and the one of the rear wheel support rollers can be made larger than the inertial forces produced by the other front wheel support roller and the other rear wheel support roller, highly easily without making the apparatus complex.

According to the present invention, there is also provided an apparatus for inspecting operation of a front/rear wheel combined brake system of a motorcycle which has an antilock brake system, comprising a pair of rotatable front wheel support rollers having respective axes lying parallel to each other, for supporting a front wheel of the motorcycle, a pair of rotatable rear wheel support rollers having respective axes lying parallel to each other, for supporting a rear wheel of the motorcycle, rotational speed measuring means coupled respectively to one of the front wheel support rollers and one of the rear wheel support rollers, for measuring respective rotational speeds of the front wheel and the rear wheel through the front and rear wheel support rollers, calculating means for determining the difference between a peak value produced by a change in the rotational speed of the front wheel when the front wheel is disengaged from braking for the first time by the antilock brake system and a peak value produced by a change in the rotational speed of the rear wheel when the rear wheel is disengaged from braking for the first time by the antilock brake system, based on the rotational speeds measured by the rotational speed measuring means, when the antilock brake system operates on the front wheel and the rear wheel in combination with each other while the front wheel and the rear wheel is being rotated, and judging means for determining whether the difference determined by the calculating means falls in a predetermined range or not.

According to the present invention, there is also provided a method of inspecting operation of a front/rear wheel combined brake system of a motorcycle which has an antilock brake system, comprising the steps of rotating a front wheel of the motorcycle which is supported on a pair of front wheel support rollers, rotating a rear wheel of the motorcycle which is supported on a pair of rear wheel support rollers, fully braking one of the front and rear wheels to operate the antilock brake system and the front/rear wheel combined brake system, measuring a rotational speed of the front wheel and a rotational speed of the rear wheel through the front and rear wheel support rollers while the one of the front and rear wheels is being fully braked, calculating the difference between a peak value produced by a change in the rotational speed of the front wheel when the front wheel is disengaged from braking for the first time when the antilock brake system operates on the front wheel and a peak value produced by a change in the rotational speed of the rear wheel when the rear wheel is disengaged from braking for the first time when the antilock brake system operates on the rear wheel, based on the measured rotational speed, and judging that the front/rear wheel combined brake system is acceptable if the calculated difference falls in a predetermined range and that the front/rear wheel combined brake system is not acceptable if the calculated difference does not fall in the predetermined range.

For inspecting the CBS on the motorcycle, the front and rear wheels are seated on and rotated by the respective pairs of front and rear wheel support rollers. Then, the brake of the front wheel or the rear wheel on which the ABS and the CBS to be inspected are to operate is fully applied to operate the ABS and the CBS (brake applying process). Specifically, if a rear wheel brake is applied in combination of a front wheel brake that is applied, then the operator operates the engine of the motorcycle on the support rollers. When the vehicle speed reaches a predetermined inspection starting speed, the operator places the transmission on the motorcycle into the neutral gear position, and fully applies the front wheel brake. When the front wheel is quickly braked, a slippage occurs between the front wheel and the front wheel support rollers, causing the ABS to start operating. When the front wheel brake is fully applied, the CBS is operated to automatically apply the rear wheel brake. The ABS for the rear wheel starts to operate in the same manner as with the ABS for the front wheel.

When the ABS for the front wheel and the ABS for the rear wheel are operated together, the front and rear wheel brakes are repeatedly applied and disengaged. The rotational speeds of the front and rear wheels are increased and reduced, and the rotational speeds of the front and rear wheel support rollers to which the rotational behavior of the front and rear wheels is transmitted are measured by the respective rotational speed measuring means (rotational speed measuring process). Based on measured values from the rotational speed measuring means, the calculating means determines a peak value produced by an increase and decrease in the rotational speed of the front wheel and a peak value produced by an increase and decrease in the rotational speed of the rear wheel. The calculating means then determines the difference between the peak values (calculating process). The judging means then determines whether the difference determined by the calculating means falls in a predetermined range or not (judging process). The difference between the peak values indicates how effective the rear wheel brake is with respect to the front wheel brake. If the difference between the peak values falls out of the predetermined range, then the rear wheel brake operates excessively with respect to the front wheel brake or operates insufficiently with respect to the front wheel brake. Therefore, by using the difference between the peak values as calculated by the calculating means in the judging process of the judging means, it is possible to determine whether the CBS is acceptable or not without sampling a period of time that elapses from the time when the brake is applied to the time when the wheel is stopped.

The difference between the peak value produced when the front wheel is disengaged from braking for the first time when the ABS operates and the peak value produced when the rear wheel is disengaged from braking for the first time when the ABS operates is used for judging whether the CBS is acceptable or not. This is because during an initial period of time after the ABS has started to operate, the vehicle speed undergoes greatest changes and it increases and decreases relatively largely depending on the rotational speed of the wheels, and operating conditions of the ABS clearly manifest themselves. Thus, the CBS can efficiently be inspected with sufficiently high accuracy, and the inspection of the CBS can be finished early. The time required to inspect the CBS can greatly be shortened.

BEST MODE FOR CARRYING OUT THE INVENTION

Figure 1:
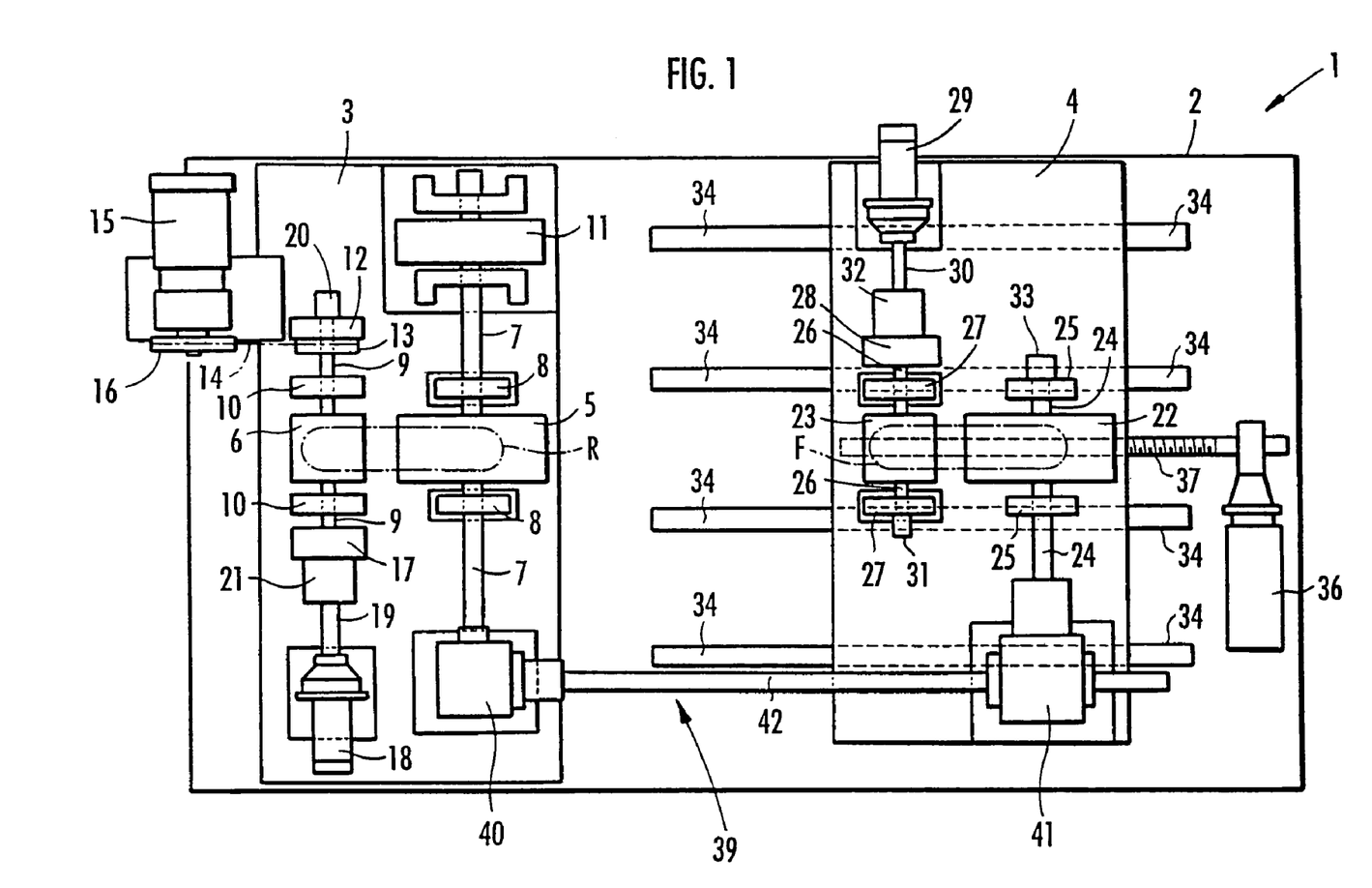
FIG. 1 is a plan view of a structure of an apparatus for inspecting a motorcycle according to an embodiment of the present invention.
Figure 2:
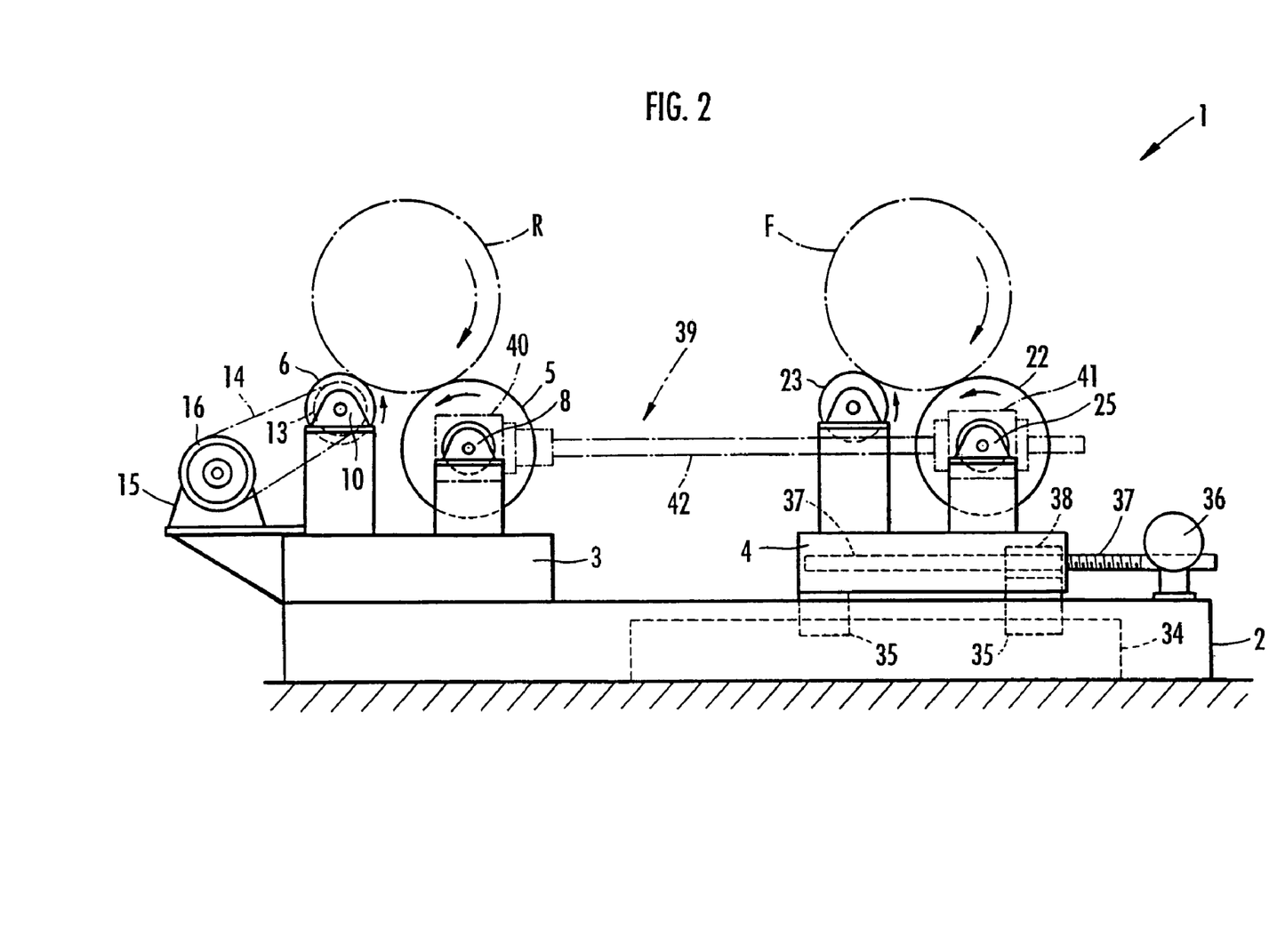
FIG. 2 is a side elevational view showing parts of the apparatus shown in FIG. 1.

As shown in FIGS. 1 and 2, an apparatus 1 for inspecting a motorcycle according to an embodiment of the present invention has a base 2, a rear wheel table 3 mounted on the base 2 for supporting a rear wheel R of the motorcycle (not shown), and a front wheel table 4 mounted on the base 2 for supporting a front wheel F of the motorcycle.

As shown in FIG. 1, the rear wheel table 3 has a pair of first and second rear wheel support rollers 5, 6 for supporting the rear wheel R seated thereon. The first rear wheel support roller 5 which is positioned on a front side of the rear wheel R has a rotatable shaft 7 rotatably supported by a pair of bearings 8. The second rear wheel support roller 6 which is positioned on a rear side of the rear wheel R has a rotatable shaft 9 extending parallel to the rotatable shaft 7 and rotatably supported by a pair of bearings 10. The first rear wheel support roller 5 is larger in diameter than the second rear wheel support roller 6, so that the inertial force produced by the first rear wheel support roller 5 upon rotation thereof is larger than the inertial force produced by the second rear wheel support roller 6 upon rotation thereof.

The first rear wheel support roller 5 and the second rear wheel support roller 6 have respective axes lying parallel to each other and spaced a predetermined distance from each other. As shown in FIG. 2, the second rear wheel support roller 6 is supported by the bearings 10 so as to be held in contact with the rear wheel R at the same vertical position as the position where the first rear wheel support roller 5 is held in contact with the rear wheel R.

As shown in FIG. 1, an electromagnetic brake 11 is coupled to an end of the rotatable shaft 7 of the first rear wheel support roller 5. The electromagnetic brake 11 operates to adjust a load imposed on the first rear wheel support roller 5.

A pulley 13 is mounted on an end of the rotatable shaft 9 of the second rear wheel support roller 6 by a clutch 12. The pulley 13 is driven by a pulley 16 of a starter operating motor 15 mounted on the base 2, through a belt 14 trained around the pulleys 13, 16. When the clutch 12 is engaged, the pulley 13 is coupled to the rotatable shaft 9, allowing the starter operating motor 15 to drive the second rear wheel support roller 6.

A motor 18 (a drive means according to the present invention) is coupled to the other end of the rotatable shaft 9 of the second rear wheel support roller 6 by a clutch 17. When the clutch 17 is engaged, the rotatable shaft 9 is connected to a drive shaft 19 of the motor 18, which is allowed to drive the second rear wheel support roller 6.

A first rotary encoder 20 (a rotational speed measuring means according to the present invention) for measuring the rotational speed of the rotatable shaft 9 is mounted on the end of the rotatable shaft 9 of the second rear wheel support roller 6. A first torque meter 21 (a torque measuring means according to the present invention) for measuring the rotational torque of the rotatable shaft 9 is mounted on the other end of the rotatable shaft 9 between the clutch 17 and the motor 18. As described in detail later on, the first torque meter 21 is used for inspecting a braking force, and the first rotary encoder 20 is used for inspecting an antilock brake system (ABS) and a front/rear wheel combined brake system (CBS).

The front wheel table 4 has a pair of first and second front wheel support rollers 22, 23 for supporting the front wheel F seated thereon. The first front wheel support roller 22 which is positioned on a front side of the front wheel F has a rotatable shaft 24 rotatably supported by a pair of bearings 25. The second front wheel support roller 23 which is positioned on a front side of the front wheel F has a rotatable shaft 26 extending parallel to the rotatable shaft 24 and rotatably supported by a pair of bearings 27. The first front wheel support roller 22 is larger in diameter than the second front wheel support roller 23, so that the inertial force produced by the first front wheel support roller 22 upon rotation thereof is larger than the inertial force produced by the second front wheel support roller 23 upon rotation thereof.

The first front wheel support roller 22 and the second front wheel support roller 23 have respective axes lying parallel to each other and spaced a predetermined distance from each other. As shown in FIG. 2, the second front wheel support roller 23 is supported by the bearings 27 so as to be held in contact with the front wheel F at the same vertical position as the position where the first front wheel support roller 22 is held in contact with the front wheel F.

The first rear wheel support roller 5 and the first front wheel support roller 22 are of the same shape as each other, and the second rear wheel support roller 6 and the second front wheel support roller 23 are of the same shape as each other. In the present embodiment, the first rear wheel support roller 5 and the first front wheel support roller 22 are larger in diameter than the second rear wheel support roller 6 and the second front wheel support roller 23 for producing a relatively large inertial force upon rotation thereof. However, a large inertial force may be produced by weights mounted on the rotatable shafts 7, 26 of the first rear wheel support roller 5 and the first front wheel support roller 22.

A motor 29 (a drive means according to the present invention) is coupled to an end of the rotatable shaft 26 of the second front wheel support roller 23 by a clutch 28. When the clutch 28 is engaged, the rotatable shaft 26 is connected to a drive shaft 30 of the motor 29, which is allowed to drive the second front wheel support roller 23.

A second rotary encoder 31 (a rotational speed measuring means according to the present invention) for measuring the rotational speed of the rotatable shaft 26 is mounted on the other end of the rotatable shaft 26 of the second front wheel support roller 23. A second torque meter 32 (a torque measuring means according to the present invention) for measuring the rotational torque of the rotatable shaft 26 is mounted on the end of the rotatable shaft 26 between the clutch 28 and the motor 29. As described in detail later on, the second torque meter 32 is used for inspecting a braking force, and the second rotary encoder 31 is used for inspecting an antilock brake system (ABS) and a front/rear wheel combined brake system (CBS).

A third rotary encoder 33 for measuring the rotational speed of the rotatable shaft 24 is mounted on an end of the rotatable shaft 24 of the first front wheel support roller 22. As described in detail later on, the third rotary encoder 33 is used for inspecting a speedometer on the motorcycle.

The front wheel table 4 is movable toward and away from the rear wheel table 3 in order to allow the inspecting apparatus to inspect motorcycles having different wheelbases. Specifically, as shown in FIG. 2, the front wheel table 4 has guide members 35 slidably guided on slide rails 34 mounted in the base 2 and a nut 38 threaded over a ball screw 37 which is rotatable about its own axis by a motor 36. When the motor 36 rotates the ball screw 37 n one direction about its own axis, the front wheel table 4 is moved along the slide rails 34 toward the rear wheel table 3.

The first front wheel support roller 22 and the first rear wheel support roller 5 are operatively coupled to each other by a coupling means 39 for rotation in synchronism with each other. The coupling means 39 has a first gearbox 40 coupled to the rotatable shaft 7 of the first rear wheel support roller 5 and a second gearbox 41 coupled to the rotatable shaft 24 of the first front wheel support roller 22. The rotatable shafts 7, 24 can be rotated in synchronism with each other by a joint shaft 42 which interconnects the first gearbox 40 and the second gearbox 41. Each of the first gearbox 40 and the second gearbox 41 is of a conventional structure including intermeshing bevel gears. The joint shaft 42 comprises a spline shaft splined to the second gearbox 41 to permit the second gearbox 41 to move in unison with the front wheel table 4.

Figure 3:
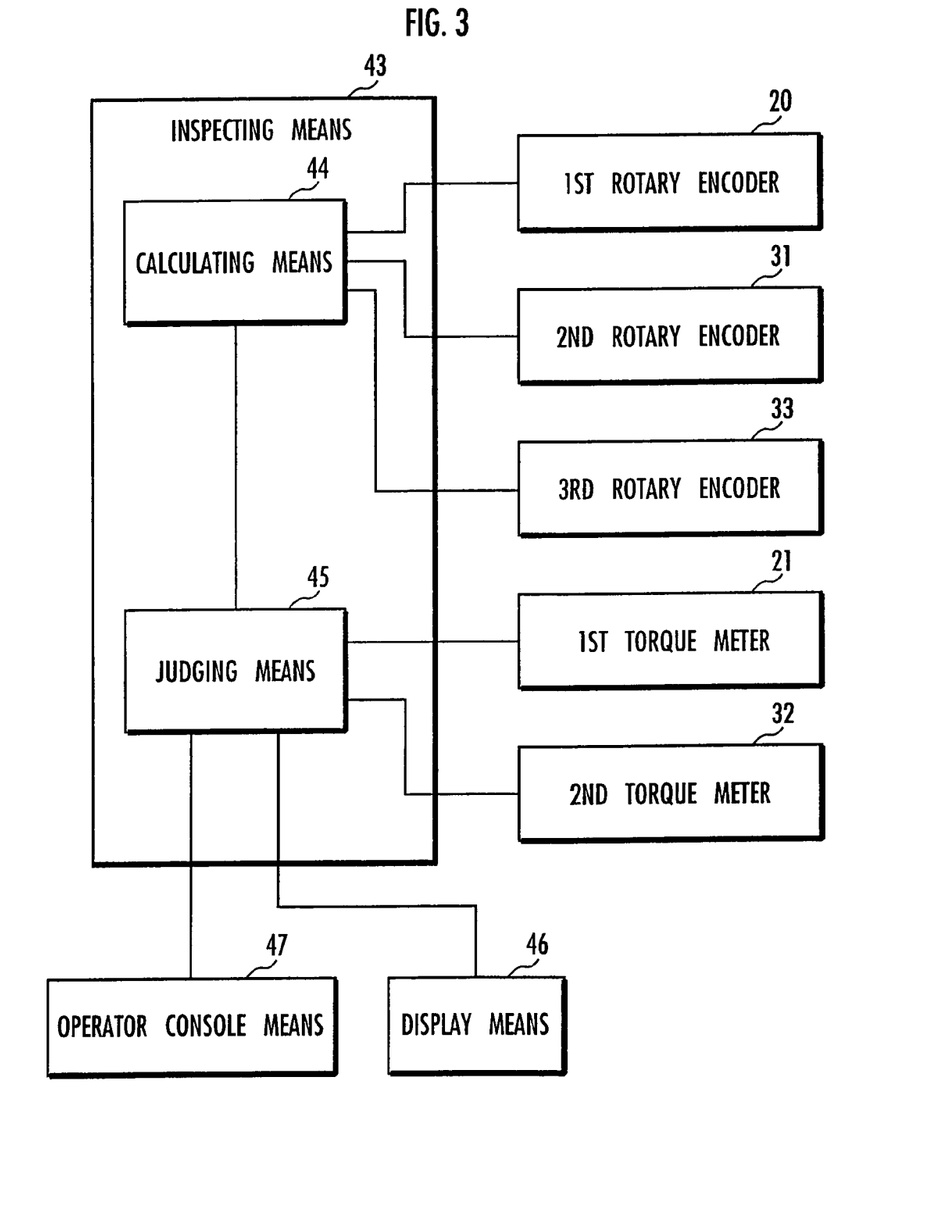
FIG. 3 is a block diagram of an inspecting means of the apparatus according to the embodiment of the present invention.

As shown in FIG. 3, the first rotary encoder 20, the second rotary encoder 31, the third rotary encoder 33, the first torque meter 21, and the second torque meter 32 are connected to an inspecting means 43 (functionally including a braking force inspecting means, a speedometer inspecting means, and a brake system inspecting means according to the present invention 9. The first rotary encoder 20, the second rotary encoder 31, the third rotary encoder 33, the first torque meter 21, and the second torque meter 32 supply measured values to the inspecting means 43. The inspecting means 43 comprises a calculating means 44 for making various calculations according to various inspecting processes based on the measured values, and a judging means 45 for judging whether the inspected items are acceptable or not. To the inspecting means 43, there are also connected a display means 46 for displaying judged results produced by the judging means 45 and measured information, and an operator console means 47 for being operated by the operator while the operator is riding on the motorcycle. A calculating process carried out by the calculating means 44 and a judging process carried out by the judging means 45 will be described later on.

A process of inspecting a motorcycle with the inspecting apparatus 1 will be described below. The inspecting apparatus 1 can inspect a wide variety of motorcycles. First, a process of inspecting a motorcycle having an ABS system which is operable in combination with each of the front and rear brakes thereof and a CBS system which is operable to apply the front and rear brakes in combination with each other will be described below. On the motorcycle, the front wheel brake is actuated and the rear wheel brake is also actuated in combination with the front wheel brake when the rider operates only a right brake lever mounted on the steering handle of the motorcycle. When the rider operates only a brake pedal, the front wheel brake is actuated and the rear wheel brake is also actuated in combination with the front wheel brake. The ABS acts on both the front wheel brake and the rear wheel brake.

Inspection modes which are performed by the inspecting apparatus 1 for the motorcycle include a front wheel braking force inspection mode, a rear wheel braking force inspection mode, a speedometer inspection mode, a front wheel ABS/CBS inspection mode, and a rear wheel ABS/CBS inspection mode, which are successively carried in the order named.

The front wheel braking force inspection mode (a braking force inspecting process for the front wheel according to the present invention) is carried out as follows: When the front wheel braking force inspection mode is started, the operator rides on the motorcycle, seats the rear wheel R of the motorcycle on the first rear wheel support roller 5 and the second rear wheel support roller 6 and the front wheel F of the motorcycle on the first front wheel support roller 22 and the second front wheel support roller 23. At this time, the engine of the motorcycle is turned off with the transmission in the neutral gear position. On the inspecting apparatus, the clutch 12 is disengaged to disconnect the pulley 13 and the rotatable shaft 9 from each other, so that the load generated by the motor 15, the pulley 16, and the belt 14 is not imposed on the rotatable shaft 9 and the second rear wheel support roller 6. The clutch 17 is engaged, connecting the rotatable shaft 9 and the motor 18 to each other. The motor 18 can now drive the second rear wheel support roller 6 through the rotatable shaft 9.

The operator who is riding on the motorcycle operates the right brake lever only to fully apply the front wheel brake. While keeping the front brake fully applied, the operator presses a front wheel braking force inspection mode start button (not shown) on the operator console means 47 (see FIG. 3). The motors 18, 29 are energized to rotate the second rear wheel support roller 6 and the second front wheel support roller 23 for a predetermined period of time. At this time, since the front wheel brake is being fully applied by the right brake lever operated by the operator, the front wheel F is stopped against rotation and the rear wheel R is also stopped against rotation by the CBS, causing friction between the second front wheel support roller 23 and the second rear wheel support roller 6, and the front wheel F and the rear wheel R. The motors 18, 29, the rotatable shaft 9 of the second rear wheel support roller 6, and the rotatable shaft 26 of the second front wheel support roller 23 are strained, and the torque meters 28, 21 measure torques that are applied to the second front wheel support roller 23 and the second rear wheel support roller 6 when the front brake is fully applied, and inputted to the inspecting means 43 shown in FIG. 43. In the inspecting means 43, the judging means 45 compares the torque values measured by the torque meters 28, 21 with a predetermined torque value (a preset judgement value). If a maximum value of the measured torques exceeds the predetermined torque value, then the judging means 45 controls the display means 46 to display "OK". If the maximum value of the measured torques is equal to or lower than the predetermined torque value, then the judging means 45 controls the display means 46 to display "NG". If the braking force is "NG", then the operator removes the motorcycle from the inspecting apparatus 1 and adjusts the front wheel brake. If the braking force is "OK", then the inspecting apparatus 1 carries out the rear wheel braking force inspection mode.

The rear wheel braking force inspection mode (a braking force inspecting process for the rear wheel according to the present invention) is carried out after the motors 18, 29 are de-energized to stop rotating the second rear wheel support roller 6 and the second front wheel support roller 23. The rear wheel braking force inspection mode is the same as the front wheel braking force inspection mode except that the operator releases the right brake lever and presses the brake pedal to fully apply the rear wheel brake. Therefore, the rear wheel braking force inspection mode will not be described in detail below.

After the rear wheel braking force inspection mode is finished, the inspecting apparatus 1 carries out the speedometer inspection mode. In the speedometer inspection mode (a speedometer inspecting process according to the present invention), the inspecting apparatus 1 determines whether the speedometer on the motorcycle is acceptable or not. In FIG. 1, the inspecting apparatus 1 is placed in the following state: The clutch 12 is disengaged to disconnect the pulley 13 and the rotatable shaft 9 from each other, so that the load generated by the motor 15, the pulley 16, and the belt 14 is not imposed on the rotatable shaft 9 and the second rear wheel support roller 6. The clutch 17 is also disengaged to disconnect the rotatable shaft 9, the motor 18, and the torque meter 21 from each other, so that the load generated by the motor 18 and the torque meter 21 is not imposed on the rotatable shaft 9 and the second rear wheel support roller 6. Similarly, the clutch 28 is disengaged so as not to impose the load generated by the motor 29 and the torque meter 32 on the rotatable shaft 26 and the second front wheel support roller 23.

The operator then starts the engine of the motorcycle, and adjusts the accelerator while observing the speedometer on the motorcycle. When the speedometer on the motorcycle indicates a predetermined speed (e.g., 40 km/h), the operator presses a speedometer inspection button on the operator console means 47 (see FIG. 3). As shown in FIG. 3, in the inspecting means 43, the rotational speed of the first rear wheel support roller 22 as detected by the third rotary encoder 33 is converted into a vehicle speed by the calculating means 44. If the difference between the speed value displayed on the speedometer on the motorcycle at the time the speedometer inspection button is pressed and the vehicle speed calculated by the calculating means 44 falls in a predetermined allowable range, then the judging means 45 controls the display means 46 to display "OK". If the speed difference does not fall in the predetermined allowable range, then the judging means 45 controls the display means 46 to display "NG".

Thereafter, the inspecting apparatus 1 carries out the front wheel ABS/CBS inspection mode (a braking system inspecting process for the front wheel according to the present invention). In the front wheel ABS/CBS inspection mode, the engine of the motorcycle continuously operated from the speedometer inspection mode. The operator adjusts the accelerator to reach a predetermined inspection starting speed (e.g., 60 km/h). At this time, the operator adjusts the accelerator while confirming the vehicle speed which is displayed on the display means 46 by the inspecting means 43, rather than the speed displayed on the speedometer of the motorcycle. Since the support rollers 5, 22, 6, 23 are maintained in continuous rotation by keeping the engine of the motorcycle operated, the time required to reach the predetermined inspection starting speed is greatly reduced.

When the vehicle speed reaches the predetermined inspection starting speed, the operator releases the accelerator and puts the transmission into the neutral gear position, and at the same time operates the right brake lever to fully apply the front wheel brake (a brake applying process according to the present invention). The front wheel F of the motorcycle is now quickly braked. As shown in FIG. 2, since the inertial force produced by the first rear wheel support roller 5 and the first front wheel support roller 22 upon rotation thereof is larger than the inertial force produced by the second rear wheel support roller 6 and the second front wheel support roller 23 upon rotation thereof, when the front wheel brake is fully applied, a slippage occurs between the front wheel F and the first front wheel support roller 22, causing the front wheel ABS to operate. The second front wheel support roller 23 follows the rotational behavior of the front wheel F. The first rear wheel support roller 5 is being rotated in synchronism with the first front wheel support roller 22 by the coupling means 39, causing the rear wheel R to reflect road conditions. When the front wheel brake is applied, the CBS is operated to apply the rear wheel brake. The ABS for the rear wheel R is also operated to follow the ABS for the front wheel F. At this time, the second rear wheel support roller 6 follows the rotational behavior of the rear wheel R, as with the front wheel F.

Figure 4:
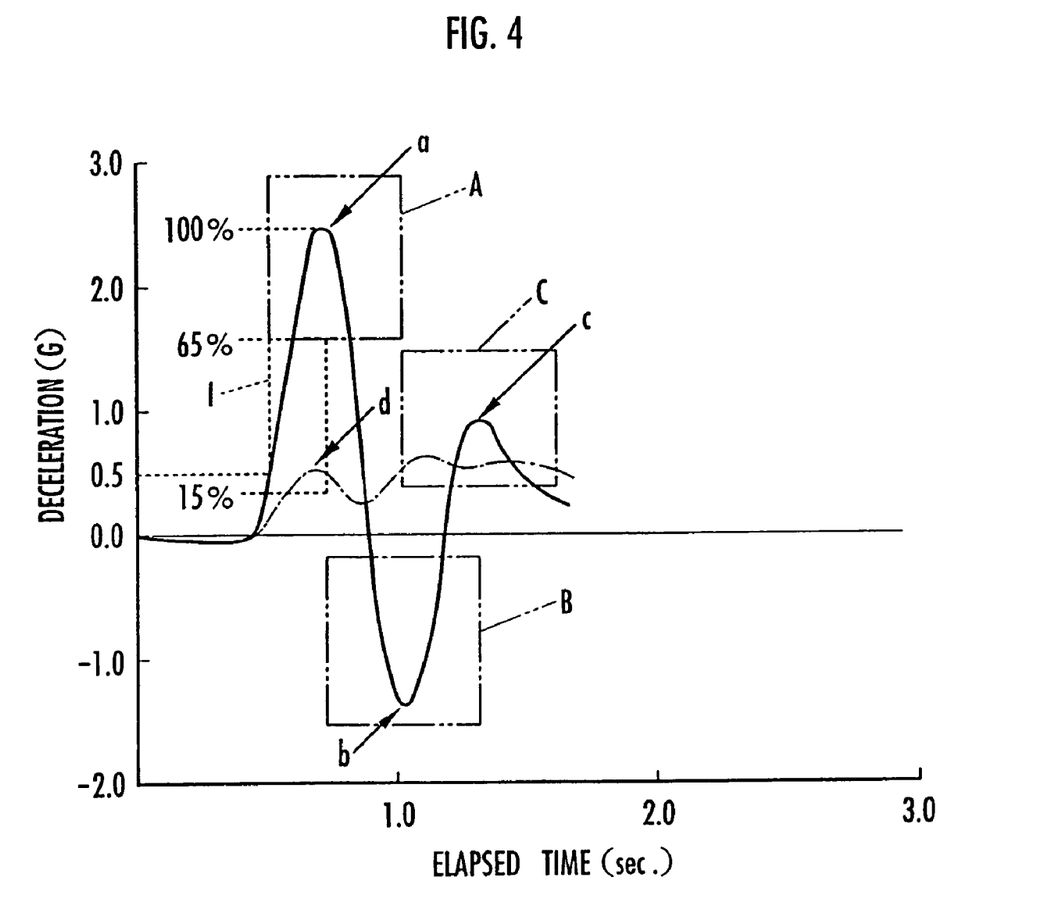
FIGS. 4 and 5 are diagrams showing peak values used in a judging means in the inspecting means shown in FIG. 3.

The rotational speeds of the second front wheel support roller 23 and the second rear wheel support roller 6 are measured by the second rotary encoder 31 and the first rotary encoder 20, respectively, (a rotational speed measuring process according to the present invention), and the calculating means 44 calculates decelerations (accelerations) of the front wheel F and the rear wheel R from the measured rotational speeds (a calculating process according to the present invention). FIG. 4 shows the waveforms of the calculated decelerations (accelerations). In FIG. 4, the solid-line waveform represents the deceleration (acceleration) calculated based on the rotational speed of the front wheel F, i.e., the second front wheel support roller 23, and the dot-and-dashline waveform represents the deceleration (acceleration) calculated based on the rotational speed of the rear wheel R, i.e., the second rear wheel support roller 6.

According to the waveform representing the deceleration (acceleration) calculated based on the rotational speed of the second front wheel support roller 23, as shown in FIG. 4, the deceleration (acceleration) starts to increase (decelerated) at the same time that the front wheel brake is fully applied, and starts to decrease (accelerated) after a first peak value a. The first peak value a corresponds to a change in the rotational speed of the second front wheel support roller 23 at the time the ABS is operated and the front wheel brake is disengaged for the first time. The deceleration decrease following the first peak value a occurs when the rotational inertia of the first front wheel support roller 22 is transmitted through the front wheel F to the second front wheel support roller 23.

When the front wheel brake is applied again, the deceleration has a second peak b, decelerating the second front wheel support roller 23. Then, the deceleration has a third peak c at which the front wheel brake is disengaged again, accelerating the second front wheel support roller 23. Thereafter, the ABS is operated to apply and disengage the front wheel brake repeatedly for several times.

According to the waveform of the deceleration (acceleration) calculated based on the rotational speed of the second rear wheel support roller 6, the CBS is operated to apply the rear wheel brake in combination with the front wheel brake, and the ABS associated with the rear wheel R is operated to change the rotational speed of the second rear wheel support roller 6. The deceleration has a first peak value d at the time the ABS is operated and the rear wheel brake is disengaged for the first time.

The judging means 45 samples the first peak value a, the second peak value b, and the third peak value c from the waveform of the deceleration (acceleration) of the front wheel F, and determines whether the front wheel ABS operates acceptably or not. The judging means 45 also samples the first peak value a from the waveform of the deceleration (acceleration) of the front wheel F and the first peak value d from the waveform of the deceleration (acceleration) of the rear wheel R, and determines whether the CBS operates acceptably or not.

Specifically, a preset first acceptance area A (enclosed by the two-dot-and-dash line A in FIG. 4) is provided for the first peak value a of the waveform of the deceleration (acceleration) of the front wheel F. The first acceptance area A starts at a time when the deceleration calculated by the calculating means 44 based on the measured value from the second rotary encoder 31 (see FIG. 1) has reached 0.5 G, i.e., when the deceleration is regarded as being caused by the brake, and is defined between allowable upper and lower deceleration limits within a predetermined period of time. A preset second acceptance area B (enclosed by the two-dot-and-dash line B in FIG. 4) is provided for the second peak value b of the waveform of the deceleration (acceleration) of the front wheel F. The second acceptance area B starts at a time when the first peak value a appears, and is defined between allowable upper and lower deceleration limits within a predetermined period of time. Similarly, a preset second acceptance area C (enclosed by the two-dot-and-dash line C in FIG. 4) is provided for the third peak value c of the waveform of the deceleration (acceleration) of the front wheel F. The third acceptance area C starts at a time when the second peak value b appears, and is defined between allowable upper and lower deceleration limits within a predetermined period of time.

The judging means 45 determines whether the front wheel ABS operates acceptably or not (an acceptance judging process according to the present invention) by determining whether the first peak value a, the second peak value b, and the third peak value c fall respectively in the first acceptance area A, the second acceptance area B, and the third acceptance area C. Specifically, if all the peak values a, b, c fall in the respective acceptance areas A, B, C, then the judging means 45 controls the display means 46 to display "ABS OK". If any one of the peak values a, b, c does not fall in the corresponding one of the respective acceptance areas A, B, C, then the judging means 45 controls the display means 46 to display "ABS NG".

Simultaneously, the calculating means 44 calculates the difference between the first peak value a of the waveform of the deceleration (acceleration) of the front wheel F and the first peak value d of the waveform of the deceleration (acceleration) of the rear wheel R, i.e., a ratio of the first peak value d for the rear wheel R to the first peak value a for the front wheel F in the present embodiment (a calculating process according to the present invention). The judging means 45 then determines whether the CBS operates acceptably or not (an acceptance judging process according to the present invention) by determining whether the calculated difference or ratio falls in a predetermined range I (65% to 15% of the first peak value a for the front wheel F) or not. The range I is determined in order to apply combined front and rear braking forces in an optimum distribution, from the time and braking force intensity at which the rear wheel R is braked in combination with the front wheel F. If the first peak value d for the rear wheel R falls in the range I, then the judging means 45 controls the display means 46 to display "CBS OK". If the first peak value d for the rear wheel R does not fall in the range I, then the judging means 45 controls the display means 46 to display "CBS NG".

In the present embodiment, as described above, the first peak value a, the second peak value b, and the third peak value c are sampled from the waveform of the deceleration (acceleration) of the front wheel F to determine whether the front wheel ABS operates acceptably or not, and the first peak value a is sampled from the waveform of the deceleration (acceleration) of the front wheel F and the first peak value d is sampled from the waveform of the deceleration (acceleration) of the rear wheel R to determine whether the CBS operates acceptably or not. Consequently, the front wheel ABS and CBS can be inspected within a short period of time in a relatively initial stage after the inspection of the front Wheel ABS and CBS has started. The period of time required to inspect the front wheel ABS and the CBS is thus greatly reduced.

The waveform of the deceleration (acceleration) of the front wheel F also has peak values after the third peak value c. However, as can be understood from the known ABS characteristics, those peak values after the third peak value c have relatively small variations of acceleration and deceleration. During a period of time in which the first peak value a, the second peak value b, and the third peak value c appear in the initial phase of operation of the ABS, the vehicle speed undergoes greatest changes and hence any ABS failures clearly manifest themselves. According to the present embodiment, the front wheel ABS and CBS are judged based on the first peak value a, the second peak value b, and the third peak value c at which changes in the deceleration (acceleration) of the front wheel F are relatively large, and hence can be judged with high accuracy in a short period of time. The present invention does not preclude the other peak values which appear subsequently to the first peak value a, the second peak value b, and the third peak value c from being used in addition to those peak values a, b, c in determining whether the ABS operates acceptably or not.

Then, the inspecting apparatus 1 carries out the rear wheel ABS/CBS inspection mode (a braking system inspecting process for the rear wheel according to the present invention). In the rear wheel ABS/CBS inspection mode, the engine of the motorcycle continuously operated from the front wheel ABS/CBS inspection mode. The operator adjusts the accelerator to reach a predetermined inspection starting speed (e.g., 60 km/h). At this time, since the support rollers 5, 22, 6, 23 are maintained in continuous rotation by keeping the engine of the motorcycle operated, the time required to reach the predetermined inspection starting speed is greatly reduced.

When the vehicle speed reaches the predetermined inspection starting speed, the operator releases the accelerator and puts the transmission into the neutral gear position, and at the same time presses the brake pedal to fully apply the rear wheel brake (a brake applying process according to the present invention). The rear wheel F of the motorcycle is now quickly braked. As shown in FIG. 2, since the inertial force produced by the first rear wheel support roller 5 and the first front wheel support roller 22 upon rotation thereof is larger than the inertial force produced by the second rear wheel support roller 6 and the second front wheel support roller 23 upon rotation thereof, when the rear wheel brake is fully applied, a slippage occurs between the rear wheel R and the first rear wheel support roller 5, causing the rear wheel ABS to operate. The second rear wheel support roller 6 follows the rotational behavior of the rear wheel R. The first front wheel support roller 22 is being rotated in synchronism with the first rear wheel support roller 5 by the coupling means 39, causing the front wheel R to reflect road conditions. When the rear wheel brake is applied, the CBS is operated to apply the front wheel brake. The ABS for the front wheel F is also operated to follow the ABS for the rear wheel R. At this time, the second front wheel support roller 23 follows the rotational behavior of the front wheel F.

Figure 5:
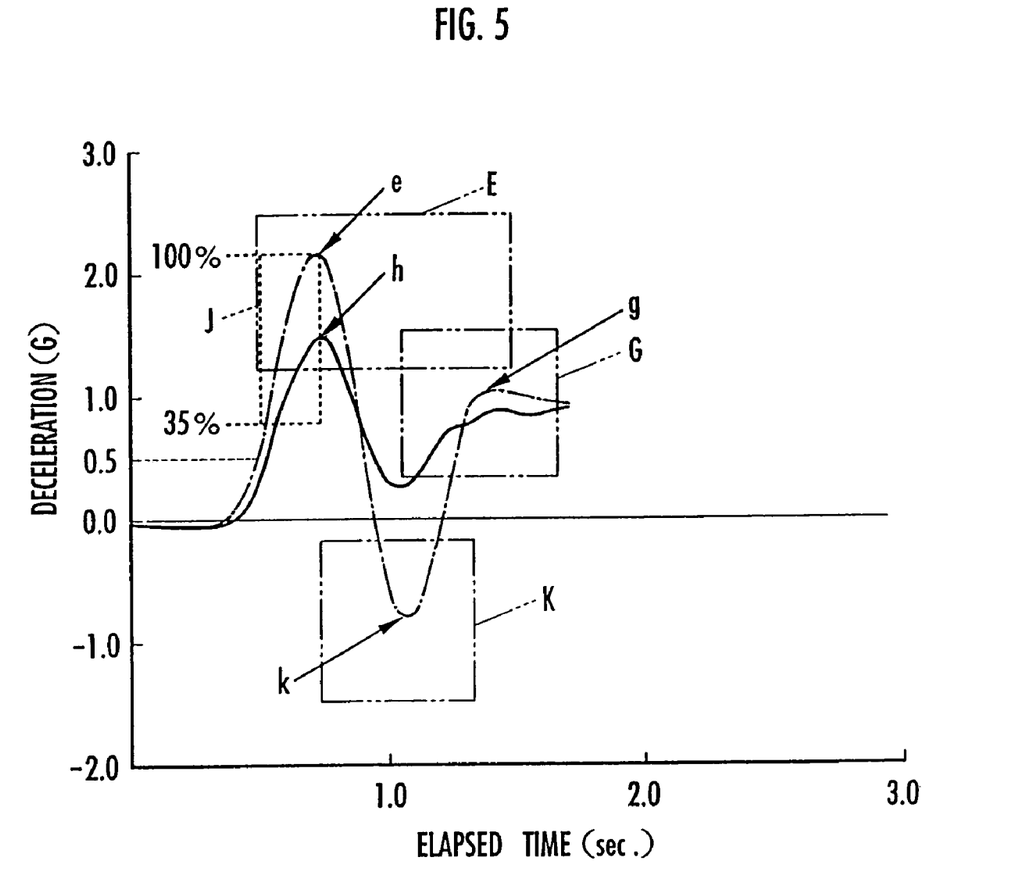

As with the front wheel ABS/CBS inspection mode, the rotational speeds of the second rear wheel support roller 6 and the second front wheel support roller 23 are measured by the first rotary encoder 20 and the second rotary encoder 31, respectively, (a rotational speed measuring process according to the present invention), and the calculating means 44 calculates decelerations (accelerations) of the rear wheel R and the front wheel F from the measured rotational speeds (a calculating process according to the present invention). FIG. 5 shows the waveforms of the calculated decelerations (accelerations). In FIG. 5, the dot-and-dash-line waveform represents the deceleration (acceleration) calculated based on the rotational speed of the rear wheel R, i.e., the second rear wheel support roller 6, and the solidline waveform represents the deceleration (acceleration) calculated based on the rotational speed of the front wheel F, i.e., the second front wheel support roller 23.

According to the waveform representing the deceleration (acceleration) calculated based on the rotational speed of the second rear wheel support roller 6, as shown in FIG. 5, the deceleration (acceleration) starts to increase (decelerated) at the same time that the rear wheel brake is fully applied, and starts to decrease (accelerated) after a first peak value e. The first peak value e corresponds to a change in the rotational speed of the second rear wheel support roller 6 at the time the ABS is operated and the rear wheel brake is disengaged for the first time. The deceleration decrease following the first peak value e occurs when the rotational inertia of the first rear wheel support roller 5 is transmitted through the rear wheel R to the second rear wheel support roller 6.

When the rear wheel brake is applied again, the deceleration has a second peak k, decelerating the second rear wheel support roller 6. Then, the deceleration has a third peak g at which the rear wheel brake is disengaged again, accelerating the second rear wheel support roller 6. Thereafter, the ABS is operated to apply and disengage the rear wheel brake repeatedly for several times.

According to the waveform of the deceleration (acceleration) calculated based on the rotational speed of the second front wheel support roller 23, the CBS is operated to apply the front wheel brake in combination with the rear wheel brake, and the ABS associated with the front wheel F is operated to change the rotational speed of the second front wheel support roller 23. The deceleration has a first peak value h at the time the ABS is operated and the front wheel brake is disengaged for the first time.

The judging means 45 determines whether the rear wheel ABS operates acceptably or not in the same manner as with the front wheel ABS/CBS inspection mode (an acceptance judging process according to the present invention). Specifically, the judging means 45 whether the rear wheel ABS operates acceptably or not by determining whether the first peak value e, the second peak value k, and the third peak value g fall respectively in a first acceptance area E, a second acceptance area K, and a third acceptance area G. Specifically, if all the peak values e, k, g fall in the respective acceptance areas E, K, G, then the judging means 45 controls the display means 46 to display "ABS OK". If any one of the peak values e, g, g does not fall in the corresponding one of the respective acceptance areas E, K, G, then the judging means 45 controls the display means 46 to display "ABS NG".

Simultaneously, the calculating means 44 calculates the difference between the first peak value e of the waveform of the deceleration (acceleration) of the rear wheel R and the first peak value h of the waveform of the deceleration (acceleration) of the front wheel R, i.e., a ratio of the first peak value h for the front wheel R to the first peak value e for the rear wheel R in the present embodiment (a calculating process according to the present invention). The judging means 45 then determines whether the CBS operates acceptably or not (an acceptance judging process according to the present invention) by determining whether the calculated difference or ratio falls in a predetermined range J (100% to 35% of the first peak value e for the rear wheel R) or not. If the first peak value h for the front wheel F falls in the range J, then the judging means 45 controls the display means 46 to display "CBS OK". If the first peak value h for the front wheel F does not fall in the range J, then the judging means 45 controls the display means 46 to display "CBS NG".

The present embodiment is applied to the motorcycle in which the ABS is operated for each of the front wheel brake and the rear wheel brake, when only the front wheel brake is applied, the CBS is operated to apply the rear wheel brake in combination with the front wheel brake, and when only the rear wheel brake is applied, the CBS is operated to apply the front wheel brake in combination with the rear wheel brake. However, the present invention is also applicable to a motorcycle in which the ABS is operated for each of the front wheel brake and the rear wheel brake, when only the front wheel brake is applied, the CBS is not operated, and when only the rear wheel brake is applied, the CBS is operated to apply the front wheel brake in combination with the rear wheel brake. For inspecting such a motorcycle, the CBS judgement may be dispensed with in the front wheel ABS/CBS inspection mode. For inspecting a motorcycle which is free of a CBS and in which the ABS is operated for each of the front wheel brake and the rear wheel brake, the CBS judgement may be dispensed with in the front wheel ABS/CBS inspection mode described above and the CBS judgement may be dispensed with in the rear wheel ABS/CBS inspection mode described above. For inspecting a motorcycle which is free of any ABS and CBS for both the front and rear wheels, both the front wheel ABS/CBS inspection mode and the rear wheel ABS/CBS inspection mode described above may be dispensed with.

In the above embodiment, the rear wheel R is rotated by the engine of the motorcycle in both the front wheel ABS/CBS inspection mode and the rear wheel ABS/CBS inspection mode. However, the operator may place the transmission in the neutral gear position and the second rear wheel support roller 6 may be rotated by the motor 18 or the like. In this modification, when a predetermined inspection starting speed (e.g., 60 km/h) is reached by the rotation of the second rear wheel support roller 6, the clutch 17 is disengaged immediately before the operator applies the brake.

In FIGS. 1 and 2, with the inspecting apparatus 1 according to the present embodiment, the front wheel table 4 can be moved to a suitable position with respect to the rear wheel table 3 by rotating the ball screw 37 with the motor 36. Therefore, the inspecting apparatus 1 can inspect various motorcycles having different wheelbases between the front wheel F and the rear wheel R.

The motor 15 is not usually used in the operation of the inspecting apparatus 1. If, however, a motorcycle to be inspected does not have a self-starter motor and its engine can be started only by a kick starter or pushing along the motorcycle, then the clutch 12 may be engaged and the motor 15 may be energized to rotate the second rear wheel support roller 6 and the rear wheel R, thereby starting the engine.

The inspecting apparatus 1 according to the present embodiment also has an auxiliary roller (not shown) for stabilizing the rotation of the front and rear wheels and a duct or the like for discharging exhaust gases emitted from the motorcycle from a facility where the inspecting apparatus 1 is housed.

INDUSTRIAL APPLICABILITY

The present invention is applicable to the inspection of a motorcycle for a braking force, a speedometer, and a brake system thereof, and can inspect operation of an antilock brake system thereof and operation of a front/rear wheel combined brake system thereof highly accurately and efficiently.

The invention claimed is:

1. An apparatus for inspecting a motorcycle for a braking force, a speedometer, and a brake system thereof, comprising:
    rotatable first and second front wheel support rollers having respective axes lying parallel to each other, for supporting a front wheel of the motorcycle;
    rotatable first and second rear wheel support rollers having respective axes lying parallel to each other, for supporting a rear wheel of the motorcycle;
    coupling means for coupling the first front wheel support roller and the first rear wheel support roller to each other for synchronous rotation thereof;
    rotational speed measuring means coupled to ends of respective rotational shafts of the second front wheel support roller and the second rear wheel support roller, for measuring respective rotational speeds of said second front wheel support roller and said second rear wheel, support roller;
    a pair of drive means separably connected by clutches to the respective other ends of the rotational shafts of the second front wheel support roller and the second rear wheel support roller, for rotating said second front wheel support roller and said second rear wheel support roller, respectively, with the drive means being connected thereto by said clutches;

torque measuring means disposed between said drive means and said clutches, for measuring torques applied respectively to the rotational shafts of the second front wheel support roller and the second rear wheel support roller;

braking force inspecting means for calculating a braking force based on the torques measured by said torque measuring means and determining whether the calculated braking force is acceptable or not, when said second front wheel support roller and said second rear wheel support roller are rotated by said drive means with a driving mechanism on the motorcycle being in a neutral gear position and the motorcycle being braked;

speedometer inspecting means for calculating a vehicle speed of the motorcycle based on the rotational speed measured by one of said rotational speed measuring means and determining whether the speedometer on the motorcycle is acceptable or not, when said drive means are disconnected by the clutches from said second front wheel support roller and said second rear wheel support roller and a drive wheel of the motorcycle is driven by the driving mechanism on the motorcycle; and brake system inspecting means for determining whether an antilock brake system and a front/rear wheel combined brake system of the motorcycle operate acceptably or not based on the rotational speeds measured by said rotational speed measuring means, when said drive means are disconnected by the clutches from said second front wheel support roller and said second rear wheel support roller and the antilock brake system and the front/rear wheel combined brake system are operated while the drive wheel of the motorcycle is being driven.

2. An apparatus according to claim 1, wherein said brake system inspecting means comprises:

calculating means for calculating a change in the vehicle speed of the motorcycle based on the rotational speeds measured by said rotational speed measuring means while the rotational speeds of said second front wheel support roller and said second rear wheel support roller are being reduced when the motorcycle is braked; and judging means for determining whether said antilock brake system and said frontier wheel combined brake system operate acceptably or not based on the change calculated by said calculating means, without said second front wheel support roller and said second rear wheel support roller being stopped against rotation.

3. An apparatus for inspecting operation of an antilock brake system of a motorcycle, comprising:

first and second rotatable support rollers having respective axes lying parallel to each other, for supporting a front wheel of the motorcycle;

first and second rotatable support rollers having respective axes lying parallel to each other, for supporting a rear wheel of the motorcycle, each of the first rotatable rollers having an inertia that is larger than the corresponding second rotatable roller;

rotational speed measuring means for measuring a rotational speed of at least one of the front and rear wheels, the rotational speed measuring means being coupled through the at least one of the second rotatable support rollers which support said front and rear wheels when said antilock brake system operates on said at least one of the front and rear wheels;

calculating means for determining a peak value produced by a change in the rotational speed of said one of the front and rear wheels when said antilock brake system operates, based on the rotational speed measured by said rotational speed measuring means; and judging means for determining whether the peak value determined by said calculating means falls in a predetermined range or not.

4. An apparatus for inspecting operation of an antilock brake system of a motorcycle, comprising:

a pair of rotatable front wheel support rollers having respective axes lying parallel to each other, for supporting a front wheel of the motorcycle;

a pair of rotatable rear wheel support rollers having respective axes lying parallel to each other, for supporting a rear wheel of the motorcycle;

coupling means for connecting one of said front wheel support rollers and one of said rear wheel support rollers to each other for synchronous rotation thereof; and rotational speed measuring means coupled respectively to the other of said front wheel support rollers and the other of said rear wheel support rollers, for measuring respective rotational speeds of said other front wheel support roller and said other rear wheel support roller;

wherein inertial forces produced by said one of the front wheel support rollers and said one of the rear wheel support rollers which are connected by said coupling means are larger than inertial forces produced by said other front wheel support roller and said other rear wheel, support roller which are coupled to said rotational speed measuring means.

5. An apparatus according to claim 4, wherein said one of the front wheel support rollers and said one of the rear wheel support rollers which are connected by said coupling means are larger in diameter than said other front wheel support roller and said other rear wheel support roller which are coupled to said rotational speed measuring means.

6. An apparatus for inspecting operation of a front/rear wheel combined brake system of a motorcycle which has an antilock brake system, comprising:

a pair of rotatable front wheel support rollers having respective axes lying parallel to each other, for supporting a front wheel of the motorcycle;

a pair of rotatable rear wheel support rollers having respective axes lying parallel to each other, for supporting a rear wheel of the motorcycle;

rotational speed measuring means coupled respectively to one of said front wheel support rollers and one of said rear wheel support rollers, for measuring respective rotational speeds of the front wheel and the rear wheel, through said front and rear wheel support rollers;

calculating means for determining the difference between a peak value produced by a change in the rotational speed of said front wheel when the front wheel is disengaged from braking for the first time by the antilock brake system and a peak value produced by a change irk the rotational speed of said rear wheel when the rear wheel is disengaged from braking for the first time by the antilock brake system, based on the rotational speeds measured by said rotational speed measuring means, when said antilock brake system operates on said front wheel and said rear wheel in combination with each other while said front wheel and said rear wheel is being rotated; and judging means for determining whether the difference determined by said calculating means falls in a predetermined range or not.

7. A method of inspecting a motorcycle for a braking force, a speedometer, and a brake system thereof, comprising the steps of:

seating a front wheel of the motorcycle on first and second rotatable front wheel support rollers having respective axes lying parallel to each other;

seating a rear wheel of the motorcycle on first and second rotatable rear wheel support rollers having respective axes lying parallel to each other;

inspecting a braking force based on torques applied to rotational shafts of said second of the front wheel support rollers and said second of the rear wheel support rollers when said second front wheel support roller and said second rear wheel support roller are rotated by a drive means separably coupled to said rotational shafts, with a driving mechanism on the motorcycle being in a neutral gear position and the motorcycle being braked, the drive means not being coupled to the first front wheel support roller and the first rear wheel support roller;

calculating a vehicle speed of the motorcycle based on the rotational speed of either one of said first and second front and rear wheel support rollers to inspect the speedometer on the motorcycle, when said drive means are disconnected from said second front and rear wheel support rollers and a drive wheel of the motorcycle is driven by the driving mechanism on the motorcycle; and thereafter, inspecting an antilock brake system and a front/rear wheel combined brake system of the motorcycle for operation thereof while keeping the support rollers in rotation by calculating a change in a vehicle speed of the motorcycle from respective rotational speeds of said second front wheel support rollers and said second rear wheel support rollers when the antilock brake system and the front/rear wheel combined brake system are operated while the drive wheel of the motorcycle is being driven by the driving mechanism on the motorcycle, reducing the rotational speeds of the support rollers.

8. A method of inspecting operation of an antilock brake system of a motorcycle, comprising the steps of:

rotating a front wheel of the motorcycle which is supported on first and second front wheel support rollers;

rotating a rear wheel of the motorcycle which is supported on first and second rear wheel support rollers, the rear wheel being rotated by drive means coupled to the second rear wheel support roller but not connected to the first rear wheel support roller;

fully braking one of the front and rear wheels on which the antilock brake system operates;

measuring a rotational speed of the wheel on which the antilock brake system has operated, through the support rollers which supports the wheel;

determining a peak value produced by a change in the rotational speed of said wheel when said antilock brake system operates, based on the measured rotational speed; and judging that the antilock brake system is acceptable if said determined peak value falls in a predetermined range and that the antilock brake system is not acceptable if said determined peak value does not fall in said predetermined range.

9. A method according to claim 8, wherein said step of determining a peak value comprises the step of determining a first peak value produced by a change in the rotational speed of said wheel when said wheel is disengaged from braking for the first time when said antilock brake system operates, a second peak value produced by a change in the rotational speed of said wheel when said wheel is braked next time, and a third peak value produced by a change in the rotational speed of said wheel when said wheel is disengaged from braking next time, and said step of judging comprises the step of judging that the antilock brake system is acceptable if all of the determined first, second, and third peak values fall in respective predetermined ranges, and that the antilock brake system is not acceptable if either one of said determined first, second, and third peak values do not fall in the corresponding one of the respective predetermined ranges.

10. A method of inspecting operation of a front/rear wheel combined brake system of a motorcycle which has an antilock brake system, comprising the steps of:

rotating a front wheel of the motorcycle which is supported on a pair of front wheel support rollers;

rotating a rear wheel of the motorcycle which is supported on a pair of rear wheel support rollers;

fully braking one of the front and rear wheels to operate said antilock brake system and said front/rear wheel combined brake system;

measuring a rotational speed of said front wheel and a rotational speed of said rear wheel through said front and rear wheel support rollers while said one of the front and rear wheels is being fully braked;

calculating the difference between a peak value produced by a change in the rotational speed of said front wheel when the front wheel is disengaged from braking for the first time when said antilock brake system operates on the front wheel and a peak value produced by a change in the rotational speed of said rear wheel when the rear wheel is disengaged from braking for the first time when said antilock brake system operates on the rear wheel, based on the measured rotational speed; and judging that the front/rear wheel combined brake system is acceptable if said calculated difference falls in a predetermined range and that the front/rear wheel combined brake system is not acceptable if said calculated difference does not fall in said predetermined range.

* * * * *